Patented June 9, 1925.                                            1,541,693

UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

COATING COMPOSITION AND VARNISH REVIVER.

No Drawing. Application filed February 3, 1921, Serial No. 442,245. Renewed November 19, 1924.

*To all whom it may concern:*

Be it known that I, CARLETON ELLIS, a citizen of the United States, and a resident of Montclair, in the county of Essex and State of New Jersey, have invented certain new and useful Improvements in Coating Compositions and Varnish Revivers, of which the following is a specification.

This invention relates to a coating composition, and a particular embodiment thereof is a varnish reviver. The invention, in so far as it relates to a varnish reviver, has for its object primarily the production of a composition which is a composition intended to be rubbed, brushed, or sprayed over varnished surfaces to brighten or revive the finish. Most varnish revivers are thin solutions of waxes, resins or oils, or simply diluted varnishes, they are usually somewhat slow in drying and after an application to the surface will collect dust unless preserved in a room or space which is substantially free from dust.

A number of such compositions have been proposed for the treatment of automobile surfaces. When such surfaces become dull and cracked it has heretofore been proposed to restore them by applying such a thin varnish over the surface. Oftentimes such compositions consist mainly of a non-drying oil such as petroleum oil thinned with gasoline. While the effect of the oil is to brighten the surface, dust quickly collects. The thin varnish solutions which are proposed will dry in a day or so but an automobile cannot be used safely an hour or two after the application of such a resin composition. Furthermore these varnish coatings contain acid resins and are quickly affected by ammonia of the air, alkali from soap used in washing and various atmospheric agencies, mud, etc.

In the present invention it is an object to produce a quick drying solution which may be applied readily for example by spraying over the surface of varnish or paint and particularly the surfaces of automobiles or other vehicles to form an extremely thin resistant coating which is not readily affected by ammonia or other alkalies or acids or atmospheric influences detrimental to ordinary varnish.

The basis of the composition in the preferred embodiment thereof is chlorinated rubber; that is, a good grade of rubber which has been chlorinated by the addition of from a few per cent of chlorine and upwards such that it dissolves readily in a vehicle like benzol, toluol and the like and dries quickly to form a film-like material resistant to acids and alkalies. Ordinary rubber solutions as well known when exposed in a thin layer require considerable time for the solvent to evaporate. Sometimes this takes days or weeks. In the case of some chlorinated rubber a volatile solvent will evaporate in a few minutes leaving a hard surface. The thinner such coating is applied the more quickly the evaporation and drying occurs. A chlorinated rubber containing about 45—47% of chlorin was, for a time, found on the market.

A 3 to 5% solution of such product or any other chlorinated rubber may be made in benzol as a solvent, or in place of benzol, toluol, xylol or solvent naphtha or mixtures of these may be used. When the solvent evaporates from this solution a tough film is formed but a certain amount of rippling and formation of white spots occurs in some cases. This may be quite extensive so that the surface is badly spotted or may appear merely as a blush or haze, in any event when such solution is applied to varnish and this haze forms the brilliancy of the surface is not enhanced but impaired. I find that this spotting or blushing may be overcome by the addition of a small amount of another substance of a compatible nature as for example resins, camphor and the phenol phosphates such as triphenyl and tricresyl phosphate. Such a substance is one that forms a clear transparent solid solution with chlorinated rubber, or a substance which gives with the chlorinated rubber, a solution which dries to a clear transparent solid.

Such a substance as prevents this spotting, mottling or blushing are included within the term "homogenizing agent." The phenolic phosphates are best suited for this purpose especially those noted above. In some cases the resins may be used either alone or particularly in conjunction with triphenyl or tricresyl phosphate. The hard or fossil resins are most suitable and in order to put these into solution they should be heated or " run " at various temperatures such as are employed in the manufacture of varnishes. For example congo resin may be heated to between 200 and 300° C. for several hours until it becomes quite soluble in benzol. Other resins ranging from the hard to the soft resins, synthetic resins and hydrocarbon resins such as cumaron and the like may be employed in special cases. When a resin such as cumaron or jellutong resin is used it renders the composition substantially unsaponifiable. Cumaron resin is important in this connection as it is not extensively attacked by acid or alkalies. This is of value in cases where the coating is subsequently likely to be treated with alkalies or strongly alkaline soaps, as in washing, with common soap, cheap hard soap, laundry soap, etc.

The proportion of the homogenizing agent is usually not in excess of the halogenated rubber substance, usually one-half the amount of the halogenated rubber is sufficient. The solvent employed should be one which will dissolve both the chlorinated rubber and the homogenizing agent. The aromatic hydrocarbons are generally speaking best for this purpose and the more volatile such hydrocarbon the quicker drying will be the product. By utilizing a very dilute solution of the halogenated rubber derivative and homogenizing agent with a highly volatile solvent such as benzol containing in some cases a small amount of gasoline or varnish makers naphtha, a very quick drying composition adapted to be sprayed on varnished surfaces to brighten the surface and coat the latter with a protecting film is obtained. When spraying the material as a varnish reviver, upon old varnished surfaces, it is best not to employ too highly concentrated solutions, as there may be difficulty in spraying such solution evenly upon the surface and such concentrated solutions also do not dry as rapidly as more dilute solutions. Concentrated solutions, if applied as a heavy coating, might show a tendency to flow down the sides of the finish and form flow marks which impair the appearance of the surface. When a highly dilute solution is employed this does not occur as drying takes place rapidly. Thus a 2% solution of chlorinated rubber composition with like amount or less of resin in benzol solvent forms such a quick drying film free from objectionable markings or flow lines. However, such concentrated solutions are within the scope of the invention, for other purposes.

Some rubbers in their natural state dry very slowly and are not adapted for the present purposes. Other materials such as chicle and in some cases balata and other bodies of a nature kindred to rubber are not as slow drying and may be used in some cases either with or without the addition of the chlorinated rubber. Besides rubber other chlorinated products such as chlorinated gutta percha, chlorinated chicle and chlorinated artificial rubbers may be used in the composition. It is to be understood that I consider the invention to embrace the use of chlorinated rubber, and equivalent substances such as those above referred to, as equivalents therefor, even though the term "chlorinated rubber" is employed in the appended claims.

While drying oils such as linseed oil may be introduced in some cases this is not always desirable when a glossy finish is required as linseed oil with chlorinated rubber under certain conditions tends to give a flat or dull finish. Also it dries rather slowly. Of course when such a dull finish is desired the introduction of a small amount of linseed oil is useful. If to a 5% solution of the chlorinated rubber having about 45–48% of chlorin dissolved in benzol, 1 to 2½% of linseed oil is added, the product dries to a flat finish.

I have above discussed the use of this product as a varnish reviver. It will be understood that the solution can be employed for other purposes. The proportions as above described are very suitable but can be varied between wide limits, depending on various factors, and especially on whether the solution is to be applied as a spray or otherwise.

What I claim is:—

1. A liquid coating composition comprising chlorinated rubber, a solvent therefor and a homogenizing agent.

2. A composition adapted for use as a varnish reviver comprising chlorinated rubber, a solvent therefor and a resinous homogenizing agent.

3. A liquid coating composition comprising chlorinated rubber, a solvent therefor and a homogenizing agent comprising a phosphate of a phenolic body such composition capable of drying on the surface to which it is applied.

4. A composition adapted for use as a varnish reviver comprising chlorinated rubber, a solvent therefor and a homogenizing agent comprising cresyl phosphate.

5. A composition adapted for use as a varnish reviver comprising a rubber derivative containing a halogen, an aromatic solvent therefor and a resin, the total solids not exceeding 5%.

6. A quick-drying composition adapted for use as a varnish reviver comprising a rubber derivative containing a halogen, a solvent therefor and a resin, the total solids not exceeding 5%.

7. A composition adapted for use as a varnish reviver comprising a rubber derivative containing a halogen, an aromatic solvent therefor, a resin and a phenolic phosphate.

8. A composition adapted for use as a varnish reviver comprising a rubber derivative containing a halogen, an aromatic solvent therefor, and an unsaponifiable resin.

9. A composition adapted to be sprayed on varnished surfaces to brighten the surface and coat the latter with a protecting film, which comprises a halogenated rubber substance, a solvent therefor and an unsaponifiable resin, said composition being in the form of a dilute solution.

10. A quick-drying composition to be sprayed on varnished surfaces to brighten the surface and coat the latter with a protecting film which comprises chlorinated rubber material, a solvent therefor and an unsaponifiable resin, said composition being in the form of a dilute solution.

11. A composition adapted to be sprayed on varnished surfaces to brighten the surface and coat the latter with a protecting film which comprises chlorinated rubber substance, a solvent therefor and a homogenizing agent to prevent blushing; said composition being in the form of a dilute solution.

12. A quick-drying composition adapted to be sprayed on varnished surfaces to brighten the surface and coat the latter with a protecting film which comprises a rubber compound which when by itself is a solid, a solvent therefor and a substance capable of preventing the coating from mottling or blushing, said composition being in the form of a dilute solution.

13. A liquid coating composition comprising, in a volatile solvent, a chlorinated rubber, and an agent capable of blending therewith to produce a smooth permanently homogeneous coating.

14. A coating composition containing a chlorinated rubber, cumaron resin and a solvent for these ingredients.

15. A coating composition comprising a resin which is substantially unattackable by acids or alkalies, and chlorinated rubber, the same being dissolved in a common solvent in such proportions as to form a liquid coating composition.

16. A resinous composition comprising chlorinated rubber and cumaron resin.

17. A resinous composition comprising a minor proportion of cumaron resin and a major proportion of chlorinated rubber.

18. A resinous composition comprising halogenated rubber, cumaron resin and a solvent of these materials.

CARLETON ELLIS.